United States Patent [19]
Watanabe et al.

[11] Patent Number: 5,402,024
[45] Date of Patent: Mar. 28, 1995

[54] ROTOR FOR A PERMANENT-MAGNET MOTOR

[75] Inventors: Akihiko Watanabe; Sotomitsu Maeda, both of Takefu; Hiroshi Dohi, Katano; Muneo Yamamoto, Takefu; Yukio Honda, Katano; Hiromitsu Nakano, Hirakata; Masahiro Yasohara, Amagasaki; Hisataka Kato, Sabae, all of Japan

[73] Assignee: Matsushita Electric Industrial Co., Ltd., Osaka, Japan

[21] Appl. No.: 41,217

[22] Filed: Mar. 31, 1993

[30] Foreign Application Priority Data

Apr. 6, 1992 [JP] Japan .................................. 4-083590
Jul. 9, 1992 [JP] Japan .................................. 4-181973

[51] Int. Cl.6 ............................................. H02K 21/12
[52] U.S. Cl. ...................................... 310/156; 310/42; 310/51; 310/91; 310/261
[58] Field of Search ................ 310/156, 51, 261, 264, 310/265, 91, 181, 42, 216, 262

[56] References Cited

U.S. PATENT DOCUMENTS

| | | | |
|---|---|---|---|
| 1,993,825 | 3/1935 | Bohli | 310/156 |
| 4,472,650 | 9/1984 | Advolotkin | 310/156 |
| 4,477,744 | 10/1984 | Gerber | 310/156 |
| 4,563,622 | 1/1986 | Deavers | 310/156 |
| 4,642,502 | 2/1987 | Carpenter | 310/156 |
| 4,841,186 | 6/1989 | Feigel | 310/156 |
| 5,045,740 | 9/1991 | Hishinuma | 310/156 |

FOREIGN PATENT DOCUMENTS

| | | | |
|---|---|---|---|
| 0106383A1 | 4/1984 | European Pat. Off. | |
| 0286905 | 10/1988 | European Pat. Off. | |
| 0343457 | 11/1989 | European Pat. Off. | 310/156 |
| 0413183A1 | 2/1991 | European Pat. Off. | |
| 9110277 | 7/1991 | WIPO | |

OTHER PUBLICATIONS

Patent Abstracts of Japan, vol. 10, No. 272 (E-437)(2328) 16 Sep. 1986, and JP-A-61 094 548 (FANUC Ltd.) 13 May 1986.
Patent Abstracts of Japan, vol. 8, No. 74 (E-236)(1511) 6 Apr. 1984 and JP-A-58 222 766 (Tokyo Shibaura Denki K.K.) 24 Dec. 1983.
H. Girese, "SIMODRIVE: Trendsetting Drive Systems for Machine Tools and Robots", (1986), pp. 147-149, Siemens Power Engineering & Automation VIII (1986) No. 3.

Primary Examiner—R. Skudy
Attorney, Agent, or Firm—Stevens, Davis, Miller & Mosher

[57] ABSTRACT

With a view to reduce vibrations generated by a motor and improve resistance to heat, reliability and vibration isolation properties without increasing the cost or the number of manufacturing steps in a rotor for a permanent-magnet motor, a rotor core is formed of an outer peripheral portion by which the permanent magnet is fixed, and a central portion by which a shaft is fixed, a clearance is provided between the outer peripheral portion and the central portion, and the outer peripheral portion is connected to the central portion by means of a plurality of fastening members. Thus, a rotor having excellent vibration isolation properties can be obtained. Since the rotor core is formed of laminated iron plates on which the outer peripheral portion, the central portion and the fastening members are all formed as one piece, resistance to heat, reliability and the vibration isolation properties can be enhanced without increasing the cost or the number of manufacturing steps.

5 Claims, 4 Drawing Sheets

ROTOR FOR A PERMANENT-MAGNET MOTOR

BACKGROUND OF THE INVENTION

1. Field of the Invention

The present invention relates to a rotor for a permanent-magnet motor having a vibration isolation construction for use in air conditioners, hot-water supply units or the like.

2. Description of the Related Art

In recent years, permanent-magnet motors have become widely used in fan motors because of good controllability. A conventional rotor of a permanent-magnet motor will be described below with reference to FIGS. 6, 7A and 7B.

FIG. 6 illustrates a DC brushless motor, one type of a permanent-magnet motor. As shown in FIG. 6, the permanent-magnet motor comprises a stator core 9 and a rotor core 6. A permanent magnet 5 is fixed around the outer periphery of the rotor core 6, a shaft 7 is fixed around the central portion thereof, and the shaft 7 is rotatably assembled onto a bearing 8 of a rotor frame in which the rotor core 6 is disposed. A fan 10 is fixed to the end portion of the shaft 7 by means of a nut 13.

With the above-described construction, since the rotor core 6 has insufficient vibration attenuation properties, vibrations along the path of rotation generated in a rotor due to rotary magnetic fields of the stator are transmitted to the fan 10 via the shaft 7, causing the fan 10 to vibrate and make an unpleasant noise.

As a measure for preventing such unpleasant noise, there is commonly used means whereby rubber 11 is assembled on both sides in a direction perpendicular to the thrust of the shaft 7 by a sandwich structure by making use of a fan receiving plate 14 for reducing noise generated due to resonance of the fan 10 when the fan 10 as shown in FIG. 8A is fixed to the rotary shaft 7, or means whereby rubber 12 is inserted between the shaft 7 and the fan 10 by means of bosses 15 and 16. Rubber is commonly used to prevent vibration. As a means for reducing generated noise, from an electrical point of view, skew magnetization is performed.

However, in the prior art, since use of rubber increases the number of assembly steps or makes the shape of the fan complex, the cost is high, and resistance of rubber to heat is problematical. Also, when skew magnetization is performed, efficiency, output and the like decrease due to loss of magnetic flux.

SUMMARY OF THE INVENTION

The present invention solves the above-mentioned problems of the prior art. It is an object of the present invention to provide a rotor for a permanent-magnet motor having excellent resistance to heat, reliability, and vibration isolation properties.

To achieve the above object, in the rotor of the permanent-magnet motor in accordance with the present invention, a permanent magnet is fixed around the outer periphery of a rotor core, the central portion being fastened to a shaft, a clearance being provided between the outer periphery and the central portion thereof, and the outer periphery being connected to the central portion by means of a plurality of fastening members. The rotor core is so constructed that the outer periphery, the central portion and the fastening members are made in one piece.

With the above-described construction, the present invention makes it difficult for vibrations along the path of rotation to be transmitted to the shaft. The operation thereof will be described below.

FIG. 9 illustrates an example of a torsion vibration system. The natural frequency of a torsion system can be generally determined by equation (1) below:

$$\text{Natural frequency} = (K(J_1+J_2)/J_1 J_2)^{0.5}/2\pi \text{(Hz)} \quad (1)$$

$J_1$: inertia of rotor
$J_2$: inertia in which shaft, fan and the like are taken into consideration
$K$: spring constant of a screw along the path of the rotation of a rotor, generated as a result of the outer periphery of the rotor core being connected to the central portion by means of a plurality of fastening members.

The natural frequency of equation (1) should be $\frac{1}{2}^{0.5}$ or less of the cut-off frequency on the basis of vibration isolation theory. The larger the difference, the larger the vibration isolation effect. When it is so set, the rigidity of the fastening members may be decreased in terms of vibration isolation performance up to the point that the fastening members can still withstand the force for transmitting a required torque and up to the point that the shaking at the end portion of the shaft is maintained within an allowable range depending upon use. The clearance between the stator and the rotor which should be secured in the motor is uniformly maintained by means of fastening members having great rigidity radially.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1A:
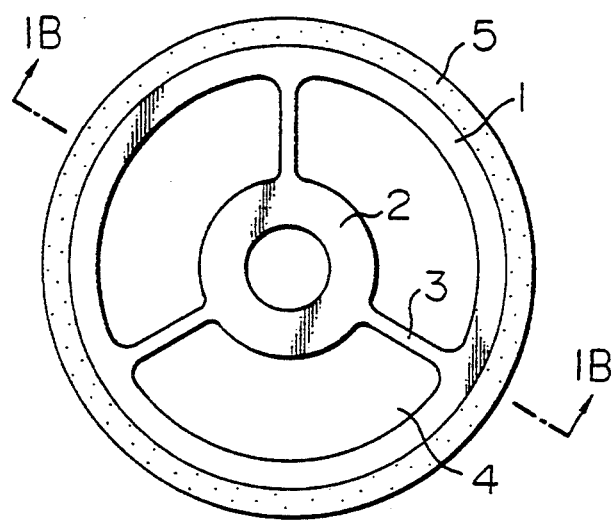
FIG. 1A is a plan view of a rotor for a permanent-magnet motor in accordance with a first embodiment of the present invention.
Figure 1B:
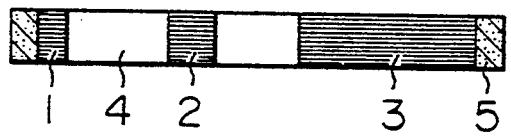
FIG. 1B is a sectional view taken along the line 1B—1B of FIG. 1A.

Preferred embodiments will be explained below with reference to FIGS. 1A and 1B, and FIGS. 2A and 2B. Components which are the same as those explained in the prior art are given the same reference numerals.

As shown in the figures, a rotor core has an outer peripheral portion 1 by which a permanent magnet 5 is fixed thereto, and a central portion 2 by which shaft is fixed thereto. The outer peripheral portion 1 is connected to the central portion 2 by means of a fastening member 3, and a clearance 4 is formed. The rotor core is formed by laminating a plurality of iron plates having the outer peripheral portion 1, the central portion 2 and the fastening member 3, all formed as one piece.

Figure 2A:
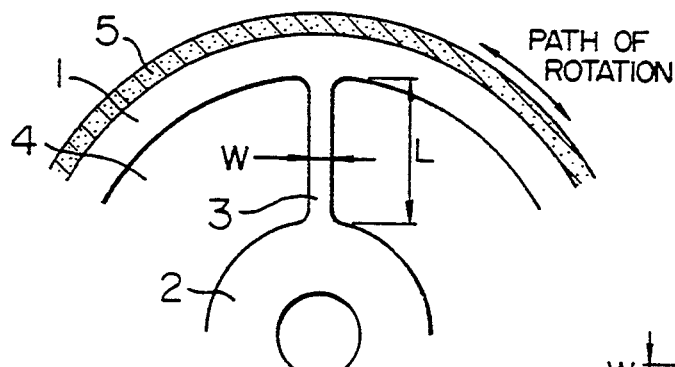
FIG. 2A is an enlarged sectional view of the rotor of the permanent-magnet motor in accordance with the first embodiment of the present invention.
Figure 2B:
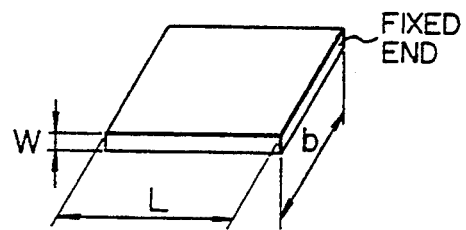
FIG. 2B is a perspective view of a fastening member shown in FIG. 2A.

Next, the operation of the rotor for a permanent-magnet motor constructed as described above will be explained with reference to FIGS. 2A and 2B. FIG. 2A is an enlarged view of the fastening member 3. FIG. 2B is a perspective view of only the fastening member 3. Rigidity of the fastening member 3 can be selected on the basis of width W and length L.

Rigidity of the fastening member 3 is determined by a cross-section second-order moment due to the shape shown in FIG. 2B, $I=bW^3/12$ (b: thickness of the laminated iron cores), and Young's modulus E. Therefore, rigidity $K'$ is generally expressed as $K'=EI$. When the length L of the fastening member 3 is taken into consideration for $K'$, eventually a spring constant K becomes K in equation (1). By selecting K appropriately, the frequency can be easily made $\frac{1}{2}^{0.5}$ or less of the frequency which cuts off the natural frequency, making it possible to prevent vibrations due to cogging torque generated along the path of the rotation of the rotor.

Figure 6:
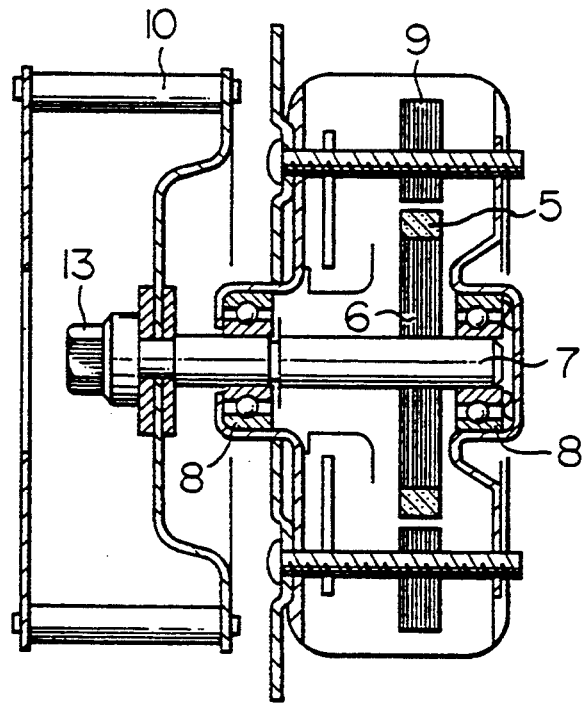
FIG. 6 is a sectional view of a conventional permanent-magnet motor.
Figure 7A:
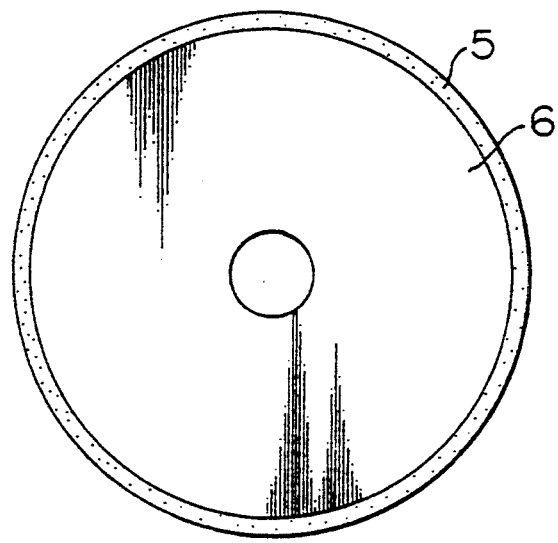
FIG. 7A is a plan view of a conventional rotor for a permanent-magnet motor.
Figure 7B:
FIG. 7B is a sectional view of the conventional rotor for the permanent-magnet motor shown in FIG. 7A.
Figure 8A:
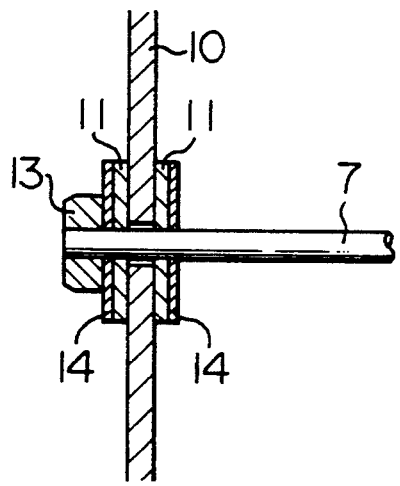
FIG. 8A is a sectional view of conventional vibration isolation means.
Figure 8B:
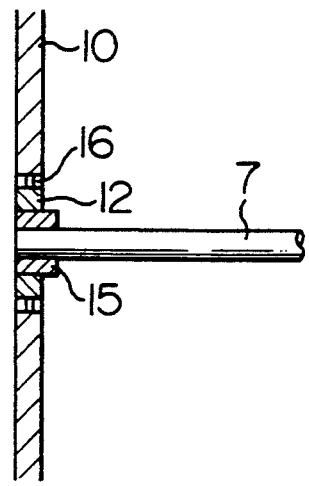
FIG. 8B is a sectional view of another conventional vibration isolation means.
Figure 9:
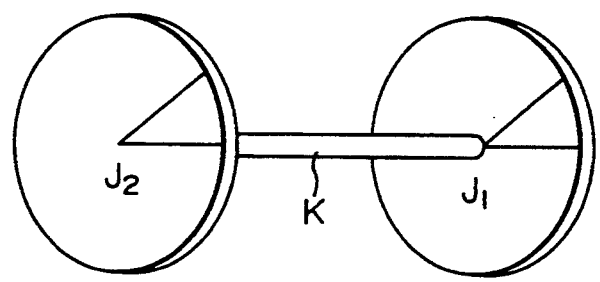
FIG. 9 is a perspective view illustrating an example of a torsion vibration system.

When the rotor of this embodiment and the conventional rotor were operated by a DC brushless fan motor shown in FIG. 6 and compared, it was confirmed that noise generated by the DC brushless fan motor, though not shown, is reduced by approximately 10 dB from the noise level of the fan motor which used the rotor of this embodiment. The rotor core of this embodiment is formed of laminated iron plates on which the outer peripheral portion 1, the central portion 2 and the fastening member 3 which connects the two portions, are all formed as one piece. This embodiment can be realized without specially providing fastening members and without increasing the cost or the number of manufacturing steps.

Figure 3:
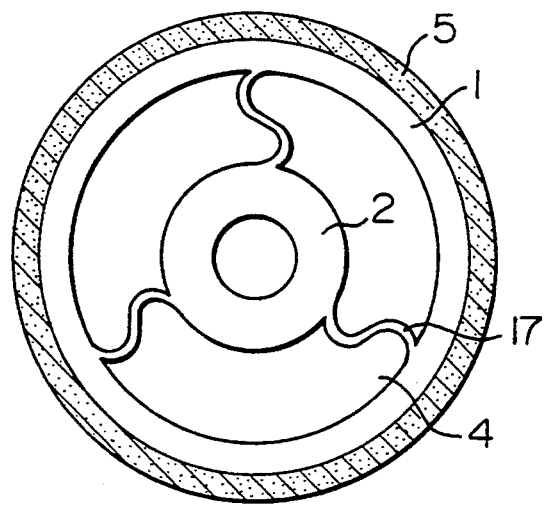
FIG. 3 is a sectional view of a rotor in accordance with another embodiment of the present invention.
Figure 4:
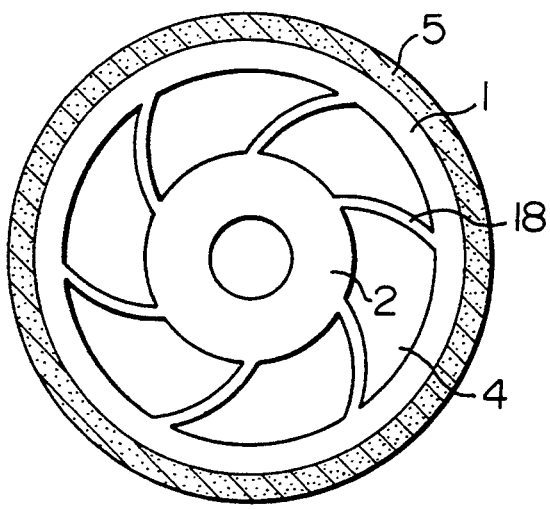
FIG. 4 is a sectional view illustrating a rotor in accordance with still another embodiment of the present invention.
Figure 5:
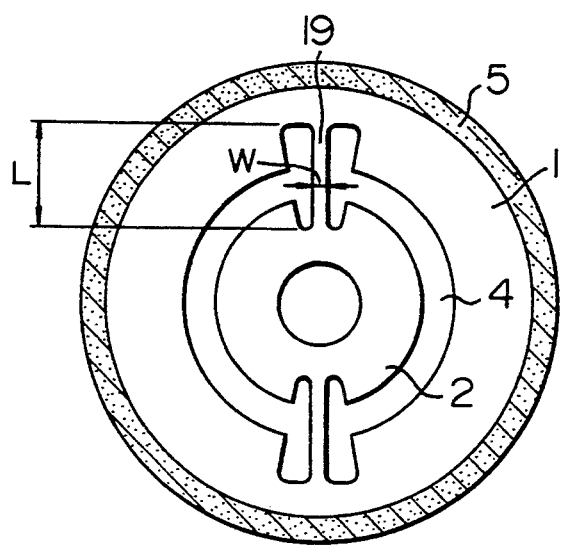
FIG. 5 is a sectional view of a rotor in accordance with yet another embodiment of the present invention.

FIGS. 3 and 4 illustrate another embodiment in which the shape of the fastening member which connects the outer peripheral portion 1 to the central portion 2 is varied. FIG. 3 illustrates a bent fastening member 17, and FIG. 4 illustrates a scrolled fastening member 18. There is another embodiment of a rotor core, shown in FIGS. 1A, 3 and 4, formed by laminating iron plates, in which embodiment the iron plates are shifted one by one or in units of several plates along the path of the rotation and laminated. FIG. 5 illustrates an embodiment in which after the clearance 4 is made as small as possible, an effective length L and width W are secured for a fastening member 19. The same effect as the above can be obtained.

As can be understood from the above explanation of the embodiments, since in the present invention a permanent magnet is fixed onto the outer peripheral portion of a rotor core and coupled to a shaft at the central portion, a clearance is provided between the outer peripheral portion and the central portion, the outer peripheral portion and the central portion are connected by a plurality of fastening members, and the shape thereof is selected appropriately, vibrations can be effectively absorbed, and factors causing instability, such as deformation due to heat or aging, can be eliminated. No loss of magnetic fluxes due to skew magnetization occurs, achieving high efficiency and high output. In addition, since a rotor core is formed by punching iron plates by a press and laminating them, a rotor of a permanent-magnet motor having excellent durability, reliability and vibration isolation properties can be provided without increasing the cost or the number of manufacturing steps.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims. The following claims are to be accorded the broadest interpretation, so as to encompass all such modifications and equivalent structures and functions.

What is claimed is:

1. A rotor for a permanent-magnet motor comprising:
    a central portion and an outer peripheral portion surrounding said central portion, wherein a clearance is provided between the outer peripheral portion and the central portion;
    a permanent magnet fixed onto the outer peripheral portion;
    a shaft fastened onto the central portion; and
    a plurality of fastening members interconnecting the outer peripheral portion and the central portion;
    wherein the outer peripheral portion, the central portion and the plurality of fastening members are all formed as one piece;
    wherein the rotor is formed by laminating a plurality of iron plates in a longitudinal direction of the rotor; and
    wherein each of the plurality of fastening members has a length L and a width W and wherein each of the plurality of iron plates has a thickness b, with said length L, said width W and said thickness b being selected to give is no plurality of fastening members a natural frequency which is no greater than $\frac{1}{2}^{0.5}$ times a cut-off frequency of the permanent-magnet motor.

2. A rotor for a permanent-magnet motor according to claim 1, wherein each of the plurality of fastening members has a curved shape.

3. A rotor for a permanent-magnet motor according to claim 1, wherein each of the plurality of fastening members has a scrolled shape.

4. A rotor for a permanent-magnet motor according to claim 1, wherein the plurality of iron plates are shifted one by one along a path of rotation of the rotor and laminated.

5. A rotor for a permanent-magnet motor according to claim 4, wherein the plurality of iron plates are shifted in units of several plates along a path of rotation of the rotor and laminated.

* * * * *